United States Patent [19]

Wong et al.

[11] 4,155,262

[45] May 22, 1979

[54] METAL OXIDE VARISTOR PRESSURE SENSOR AND METHOD

[75] Inventors: Joe Wong, Schenectady; Francis P. Bundy, Alplaus, both of N.Y.

[73] Assignee: General Electric Company, Schenectady, N.Y.

[21] Appl. No.: 879,369

[22] Filed: Feb. 21, 1978

Related U.S. Application Data

[63] Continuation-in-part of Ser. No. 793,039, May 2, 1977, abandoned.

[51] Int. Cl.[2] .......... G01L 9/06

[52] U.S. Cl. .......... 73/754; 73/777; 338/4

[58] Field of Search .......... 73/754, 753, 750, 88.5 SD, 73/777; 338/4

[56] References Cited

U.S. PATENT DOCUMENTS

| | | | |
|---|---|---|---|
| 3,682,841 | 8/1972 | Matsuoka | 338/20 |
| 3,790,870 | 2/1974 | Mitchell | 338/4 |

OTHER PUBLICATIONS

Article by Wong et al., Journal of Applied Physics 46, (1975), pp. 1653–1659.

*Primary Examiner*—Donald O. Woodiel
*Attorney, Agent, or Firm*—Lawrence D. Cutter; Joseph T. Cohen; Marvin Snyder

[57] ABSTRACT

The leakage current in metal oxide varistor bodies is found to vary as a function of applied pressure in the 0.5 kbar to 10 kbar range.

A pressure sensing device is conditioned by first prestressing a metal oxide varistor to a pressure above the range of measurement and then releasing the prestress pressure. Upon application of subsequent pressures equal or less than the prestress pressure, the leakage current in the device is found to vary as a function of pressure.

6 Claims, 6 Drawing Figures

METAL OXIDE VARISTOR PRESSURE SENSOR AND METHOD

This application is a continuation-in-part of a prior application with Ser. No. 793,039, filed May 2, 1977, now abandoned.

This invention relates to pressure sensing devices. More specifically this invention relates to devices which measure pressure in the 0.5 kbar to 10 kbar range by determination of leakage current in prestressed bodies of zinc oxide based, metal oxide varistor material.

BACKGROUND OF THE INVENTION

Pressure is not only an important extensive variable in physicochemical and thermodynamics investigation of matter, but also is an essential process parameter in certain specialized technologies which utilize a high pressure route for manufacturing a final product. In recent years, extensive efforts have been devoted to the measurement and standardization of high pressure environments (for example, "Accurate Characterization of the High Pressure Environment", editor E. C. Loyd, National Bureau of Standards, Special Publication 326, 1971). In the range from approximately 10 kbar to 300 kbar, a series of reference points—the so-called "fixed points"—indicated by phase changes and/or resistance jumps in selected materials are commonly used for pressure calibration as well as sensing. In the range below 10 kbar, that is, 0.5 kbar to 10 kbar, however, such fixed points calibrants are rare, for example, Ce at 7 kbar and the Hg freezing point at 0° C., 7.6 kbar. Manganin (84 Cu-12 Mn-4 Ni) gauges are often used in the pressure range from 2 kbar to 14 kbar and higher, but this material is rather insensitive having a pressure coefficient of electrical resistance $$k=(R/R_o)1/P$$

(where $R_o$ is the resistance at atmospheric pressure) which is on the order of $10^{-3}$ per kbar and is not constant.

Recently, non-ohmic ceramics based on ZnO have been utilized for surge protection against transient voltage and power overload. Zinc oxide based metal oxide varistors of the bulk type are, for example, described in U.S. Pat. Nos. 3,663,458 and 3,682,841, which patents are incorporated herein as background material. Prior art investigations of the properties of the metal oxide varistor materials have been performed at atmospheric pressure.

SUMMARY OF THE INVENTION

The leakage current in metal oxide varistor materials is found to vary as a function of pressure in the range from approximately 0.5 kbar to approximately 10 kbar. Reproducible pressure readings may be obtained first by prestressing a body of varistor material to a pressure above the range of measurement, subsequently releasing pressure to atmospheric level, and then applying an unknown pressure to the varistor body.

It is, therefore, an object of this invention to provide methods and materials for continuously measuring pressure in the range from approximately 0.5 kbar to approximately 10 kbar.

BRIEF DESCRIPTION OF THE DRAWINGS

The novel features believed characteristic of the present invention are set forth in the appended claims. The invention itself, together with further objects and advantages thereof, may best be understood by reference to the following detailed description, taken in connection with the appended drawings in which:

DESCRIPTION OF THE PREFERRED EMBODIMENT

Pressure within varistor samples was generated by squeezing sintered disks uniaxially between two opposing carboloy anvils in a hydraulic press. Electrical connections were made between the anvils which were properly insulated from the rest of the press. A point-by-point procedure, more particularly described in an article by Joe Wong in the *Journal of Applied Physics* 46,1653 (1975) was used to measure the current-voltage characteristics. Measurements were also taken after recycling to atmospheric pressure before subjecting the samples to a higher load. The sintered specimens were all approximately 14 millimeters in diameter by between approximately 2 millimeters and approximately 3 millimeters thick and were coated with a silver electrode on each face.

A strong dependence of electrical characteristics on pressure is evident in many zinc oxide based varistor systems. With an increase in pressure, the approximately ohmic, prebreakdown region at low current moves to higher currents over 4 or 5 orders of magnitude accompanied by a decrease in $\alpha$, the nonlinear exponent, (which is defined by the empirical relationship $I=KV^{\alpha}$ which expresses the current-voltage behavior in the nonohmic region). The leakage current $I_L$, (which is defined as the current at half the initial varistor voltage required to produce a current of 1 mA), varies monotonically with applied load.

EXAMPLES

I.

Figure 1:
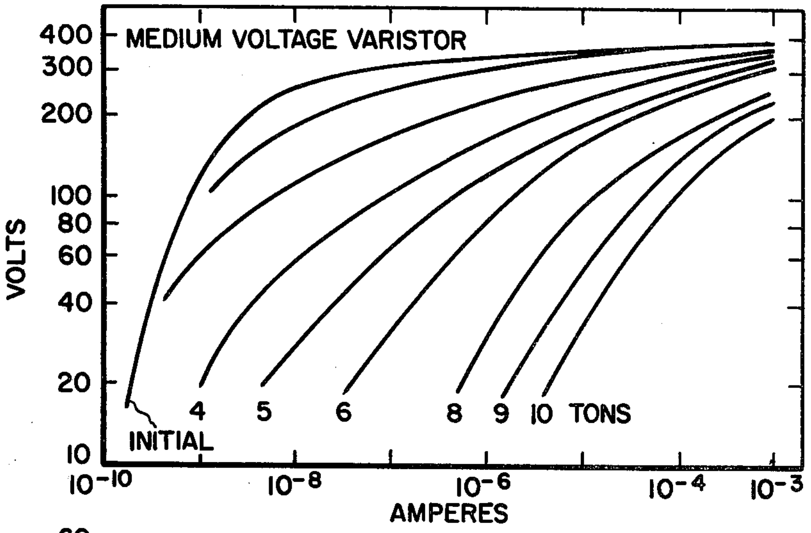
FIG. 1 illustrates the voltage-current characteristics as a function of applied pressure in samples of medium voltage metal oxide varistors.

FIG. 1 illustrates a family of voltage-current characteristics, as a function of applied pressure, for a medium voltage varistor which was produced by sintering a mixture of approximately 97 mol percent ZnO, ½ mole percent $Bi_2O_3$ together with $Co_3O_4$, $MnO_2$, $Sb_2O_3$, and $SnO_2$,

II.

Figure 2:
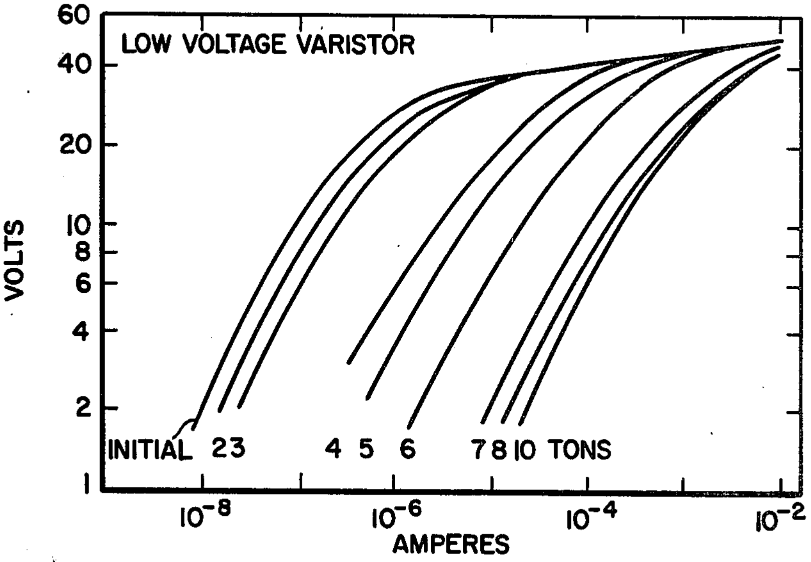
FIG. 2 illustrates the voltage-current characteristics as a function of pressure in a low voltage metal oxide varistor.

FIG. 2 illustrates a family of voltage-current characteristics, as a function of applied pressure, for a low voltage varistor which was produced by sintering a mixture of approximately 98 mol percent ZnO, ½ mol percent $Bi_2O_3$ together with $Co_3O_4$, $MnO_2$, and $TiO_2$.

III.

Figure 3:
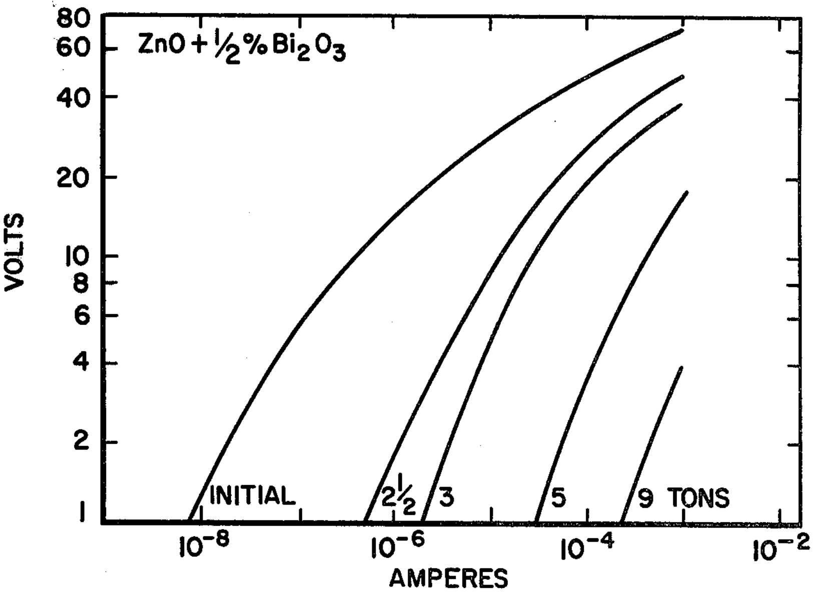
FIG. 3 illustrates the voltage-current curves as a function of pressure in a binary zinc oxide-bismuth oxide varistor.

FIG. 3 illustrates a family of voltage-current characteristics, as a function of applied pressure, for a binary varistor comprising a sintered mixture of zinc oxide with ½ mol percent $Bi_2O_3$.

Figure 4:
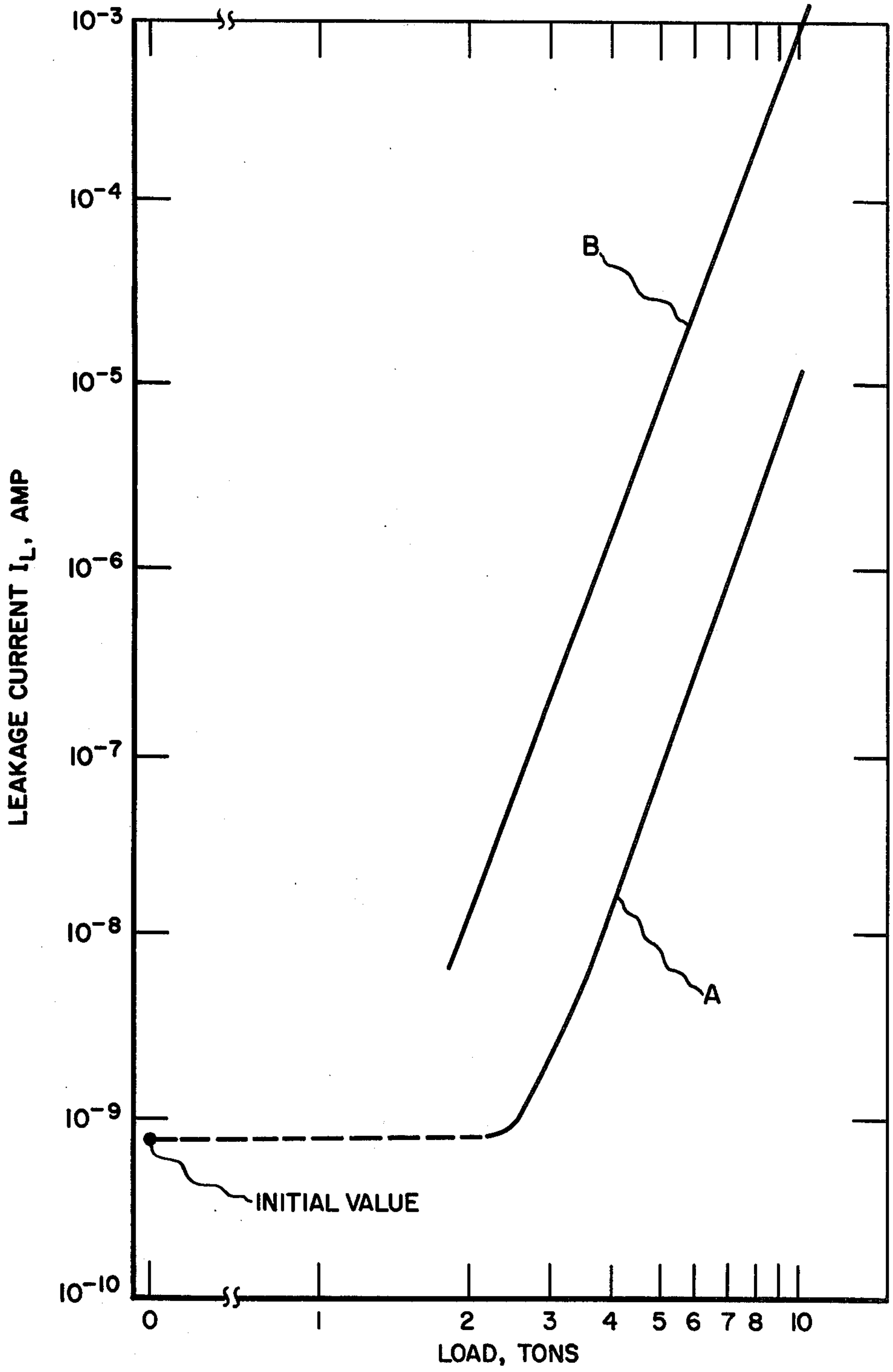
FIG. 4 illustrates the variation of leakage current as a function of applied pressure in a medium voltage metal oxide varistor.

FIG. 4 illustrates the variation of leakage current (defined as the current at approximately 200 volts) for the medium voltage varistor of FIG. 1 as a function of applied pressure. Curve B illustrates the value of leakage current under pressure while curve A illustrates the corresponding leakage current, at the same voltage, measured at atmospheric pressure after the specimen has been subjected to the corresponding load. Thus, the leakage current of such varistors may be utilized as a pressure memory device which electrically indicates the value of a previously applied force, and hence pressure. Below a load of approximately 2 tons, the varistor is seen to recover its initial characteristics. Beyond approximately 12 tons, the varistor samples loose their ceramic integrity and crumble with further applied pressure.

The variation of electrical characteristics, notably leakage current, which is obtained after subjecting a varistor sample to an initial high pressure is not reproducible; that is: the variation of electrical characteristics with applied pressure will not be identical for a first pressure application and for subsequent applications. We have determined, however, that a varistor sample which has been prestressed at a given pressure level will provide reproducible leakage current readings at subsequent pressure applications which are below the initial prestress level. Thus, an efficient pressure sensor may be produced by first prestressing a varistor sample with a pressure above the range of measurement interest, releasing the samples to atmospheric pressure, and subsequently calibrating the sample at pressures below the prestress level. However, once the pressure effects on the leakage current are determined for a given varistor formulation, single shot tests may be conducted without any prestressing on other varistors made in accordance with the same formulation.

Figure 5:
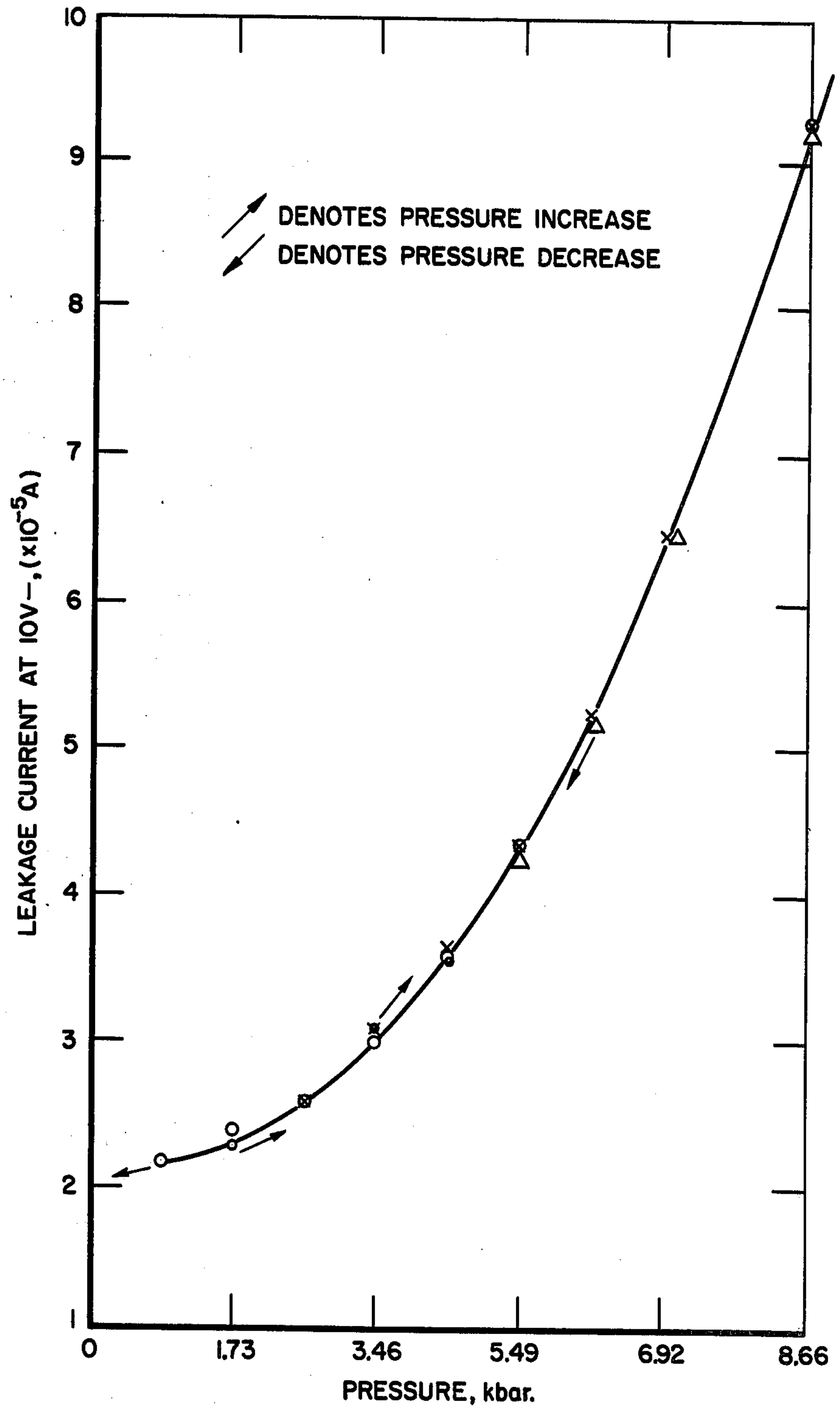
FIG. 5 illustrates the pressure-leakage characteristics for a prestressed varistor.

FIG. 5 illustrates the variation of leakage current at 10 volts vs. applied pressure for a sample which was previously described with respect to FIG. 2 which was prestressed in accordance with the method described above. Excellent reproducibility is obtained upon pressure cycling up and down from 8.66 kbar. The pressure coefficient is approximately 1000 times larger than that for Manganin wire in the same pressure range.

Figure 6:
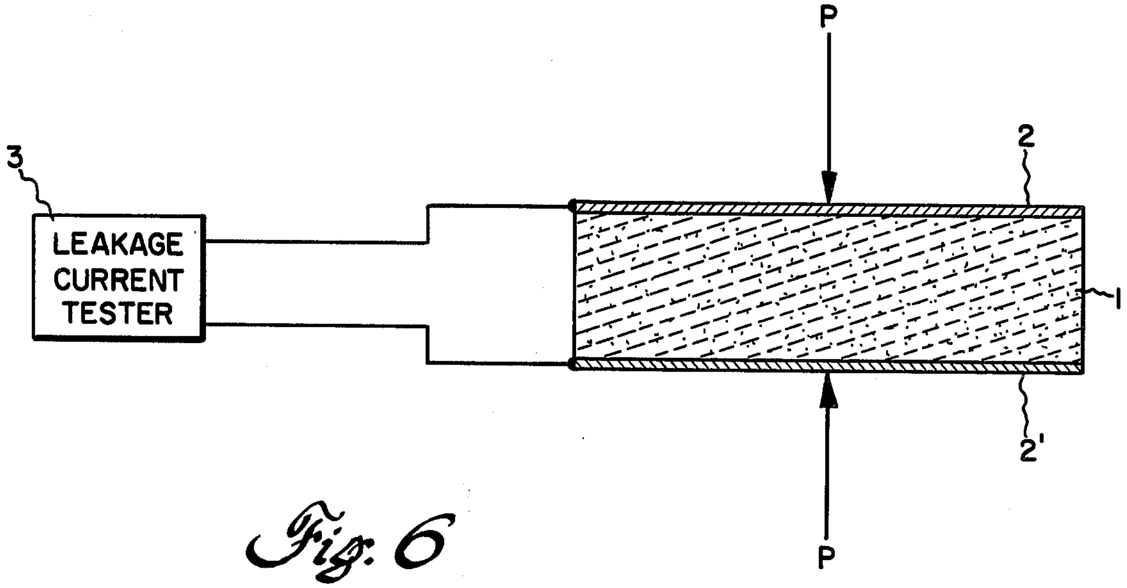
FIG. 6 is a partial side elevation view showing a varistor of the present invention being subjected to pressure and connected to a leakage current tester.

FIG. 6 illustrates the varistor 1 with attached electrodes 2 and 2' being subjected to a pressure P as described above. The varistor is also electrically connected to a leakage current tester 3 which functions to measure the current flow when the voltage applied to the varistor is equal to one-half of the voltage needed to produce a current of 1 ma through the varistor.

Varistor pressure sensors and pressure memory devices of the present invention provide highly sensitive sensor in the pressure range of approximately 0.5 kbar to approximately 10 kbar. The devices are considerably more sensitive than the Manganin wire gages which previously provided the only continuous measurement in this range.

While this invention has been described in detail herein in accord with certain preferred embodiments thereof, many modifications and changes may be effected by those skilled in the art. Accordingly, it is intended by the appended claims to cover all such modifications and changes as fall within the true spirit and scope of the invention.

The invention claimed is:

1. An electrical pressure sensor for continuously measuring pressure in a predefined range between approximately 0.5 kbar and approximately 10 kbar comprising a body of metal oxide varistor material, including a sintered mixture of zinc oxide with other metal oxides, which has been processed by first prestressing said body to a pressure above said predefined range and subsequently relieving said prestressing pressure.

2. The sensor of claim 1 wherein said varistor comprises a reaction product formed by sintering a mixture consisting essentially of approximately 97 mol percent ZnO, ½ mol percent $Bi_2O_3$ with $Co_3O_4$, $MnO_2$, $Sb_2O_3$, and $SnO_2$.

3. The sensor of claim 1 wherein said varistor comprises a reaction product formed by sintering a mixture consisting essentially of approximately 98 mol percent ZnO, ½ mol percent $Bi_2O_3$ with $Co_3O_4$, $MnO_2$, and $TiO_2$.

4. A method for determining an unknown pressure previously applied to a sintered metal oxide varistor body having a given composition, said unknown pressure being in the range from approximately 0.5 kbar to approximately 10 kbar comprising the steps of:

determining as a function of known applied pressure the leakage current in sample metal oxide varistor bodies having the same composition as said body, said leakage current being measured at atmospheric pressure after said sample bodies have been subjected to and relieved from said known applied pressure;

applying and thereafter removing said unknown pressure from said body; and subsequently determining said unknown pressure by measuring the leakage current through said varistor body.

5. The method of claim 4 wherein said varistor comprises from approximately 97 mol percent to approximately 98 mol percent ZnO, approximately ½ mol percent $Bi_2O_3$ with $Co_3O_4$, $MnO_2$ and other metal oxides.

6. A method for continuously measuring un unknown pressure in the range from approximately 0.5 kbar to approximately 10 kbar comprising:

applying said unknown pressure to a body of metal oxide varistor material which has been prestressed to a pressure above said predefined range, said prestressing pressure subsequently having been removed, and concurrent with the application of said later applied unknown pressure, measuring electrical leakage current in said material.

* * * * *